UNITED STATES PATENT OFFICE.

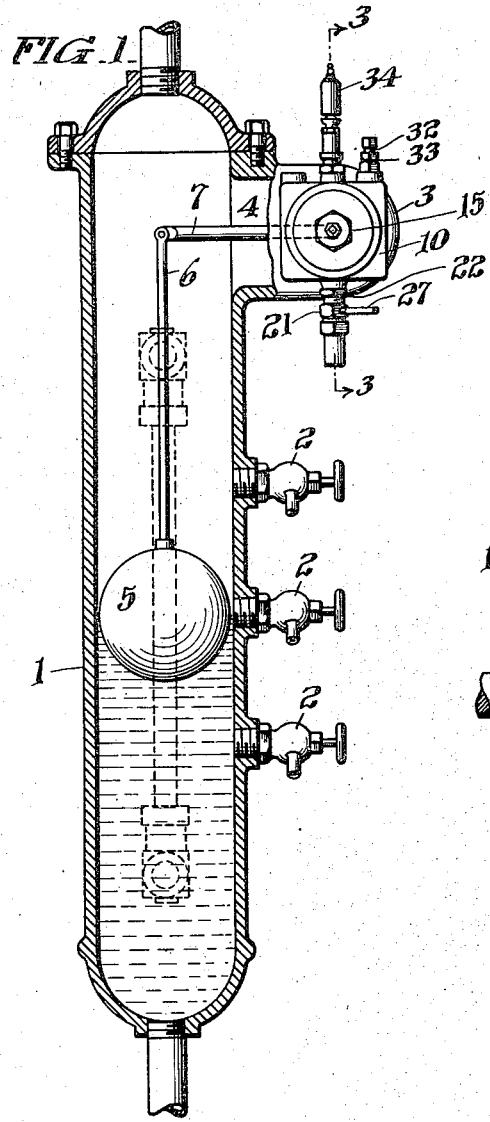
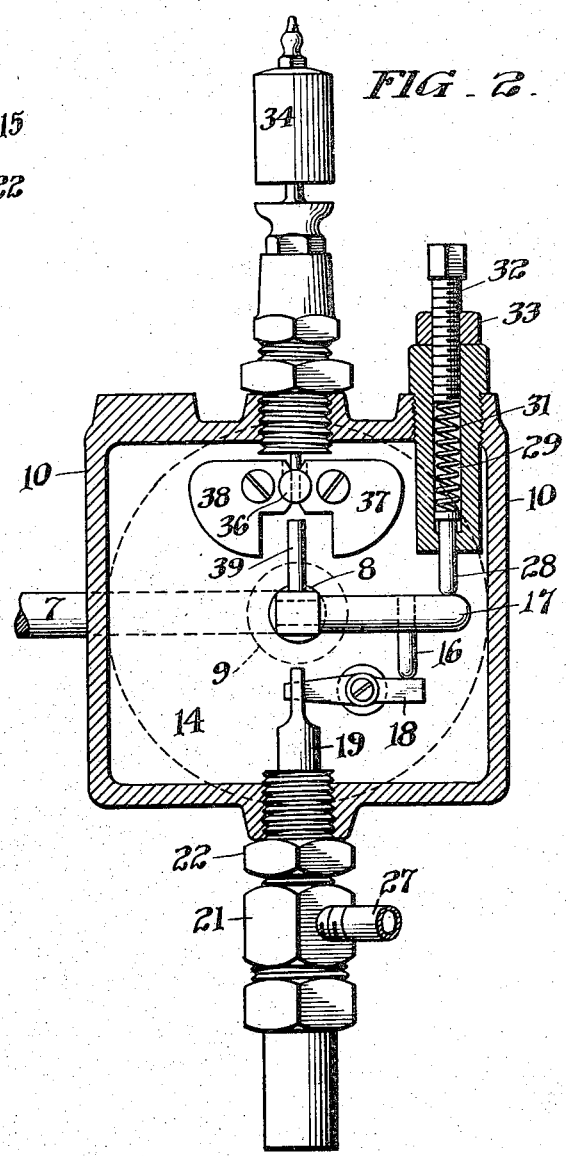

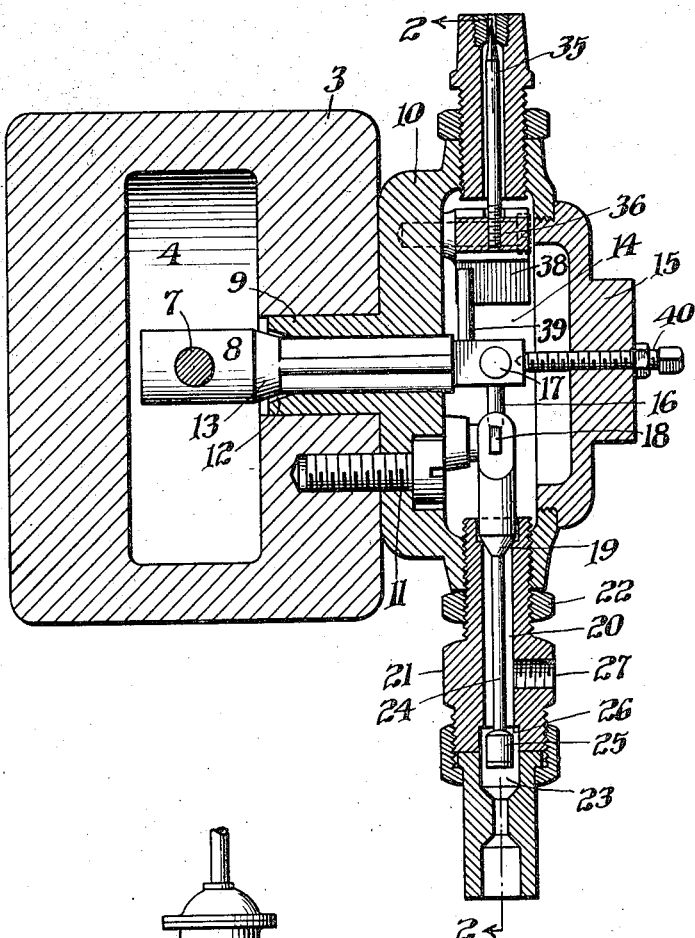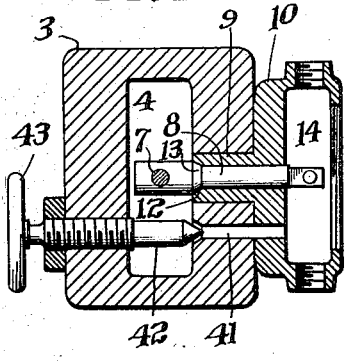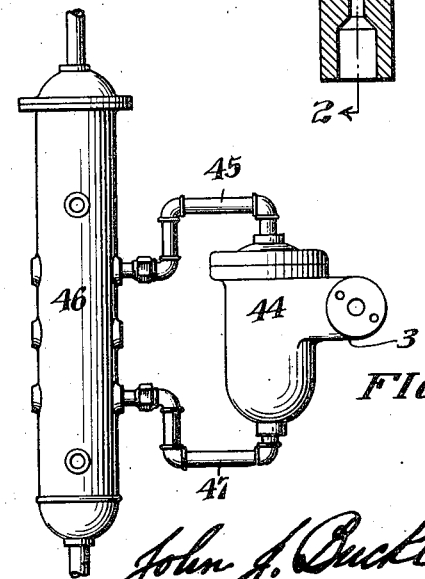

JOHN J. BUCKLEY, OF CHESTER, PENNSYLVANIA, ASSIGNOR TO FUEL ECONOMY ENGINEERING COMPANY, OF LANSDOWNE, PENNSYLVANIA, A CORPORATION OF DELAWARE.

FEED-WATER REGULATOR.

1,170,044.   Specification of Letters Patent.   Patented Feb. 1, 1916.

Application filed May 1, 1915. Serial No. 25,127.

*To all whom it may concern:*

Be it known that I, JOHN J. BUCKLEY, a citizen of the United States, residing in Chester, county of Chester, State of Pennsylvania, have invented certain new and useful Improvements in Feed-Water Regulators, of which the following is a specification.

The present invention relates to feed water regulators or devices for automatically maintaining a constant level of water or other liquids under pressure in boilers or tanks and has for an object to provide a simple and efficient apparatus for governing the flow of feed water under the control of conditions within the boiler or tank to be supplied.

In feed water regulators as heretofore constructed, special equipment is ordinarily necessary for attachment to the tank or boiler, and in many instances the customary water column must be entirely discarded before the regulator can be placed in assembled operative condition. By my present invention I have eliminated such existing disadvantages by providing a type of regulator which may be used in combination with a water column or form an auxiliary device which may be readily attached to any type of water column equipment of a boiler or tank.

A further object of the invention is to provide a feed water regulator wherein the drag or lost motion due to the weight of a float is compensated in such a manner that the parts controlled by the float are exceedingly sensitive to changes in the water level and operate positively and accurately for the purpose intended.

A further object of the invention is to provide a regulator wherein the working parts, while ordinarily contained in a steam space, may be accessible for purposes of repair or replacement without interfering with the operating conditions of the boiler or otherwise disturbing working conditions other than rendering the regulator temporarily inoperative.

The invention has for a further object to provide an automatic alarm device capable of operating under abnormal liquid levels to give due warning of the existing conditions.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Referring to the drawings: Figure 1 represents a sectional elevation of a water column for a boiler showing the regulator of my invention connected thereto in operative position; Fig. 2 represents a section on line 2—2 of Fig. 3; Fig. 3 represents a section on line 3—3 of Fig. 1; Fig. 4 represents a side elevation of a modification of the invention showing the regulator attached as an auxiliary device to a water column; Fig. 5 represents a section showing a modified form of mechanism for controlling the steam to the regulator casing.

Similar numerals of reference indicate corresponding parts.

1 designates a water column of the customary construction, having the usual trycocks 2 disposed at different levels for the purpose of testing the level in the column at will. In the present instance the column 1 is provided with an offset portion 3 at its upper end, forming a chamber 4 through which certain adjuncts of the regulating mechanism pass for connection with the control devices.

5 designates a float suspended within the water column by the rod 6, which in turn is connected to a lever arm 7 extending into the chamber 4 and having connection with a rock spindle 8 which preferably has a bearing in a tubular extension 9 on the regulator casing 10. This latter is fixedly secured to the offset 3 by fastening studs 11 or like means and has an extension 9 seating within a suitable opening of the offset wall to form a bearing for the spindle 8. In this connection it will be noted that in the preferred form of the invention the inner end of the extension is provided with a valve seat 12 of suitable contour to receive the conical portion of the valve piece 13, which is formed as an integral part of the rock spindle 8 and located in the chamber 4 while the fluted stem of said spindle extends into the chamber 14 formed by the casing 10 so that steam may pass freely from one chamber to the other under normal operative conditions. The casing 10 is provided with a closure 15 removably attached thereto so that access may be had to the parts contained within the chamber 14, if desired.

16 designates a pin or lug fixed to an arm 17 carried by the spindle 8 and projecting laterally into the chamber 14 so that the pin 16 is located a suitable distance from the axis of the spindle to produce the desired lever action when the parts are shifted to bring the pin into contact with the pivoted lever 18, which controls steam to the pump, control valve, or like mechanism. One end of the lever 18 as here shown is connected to a valve piece 19, the function of which is to control the inlet to the passage 20 formed in the nipple 21. This nipple is preferably adjustably connected to the auxiliary casing 10 so that the relation between the valve and its seat may be varied according to requirements for the purpose of regulating the point at which the valve opens or closes. A suitable type of lock nut 22 is provided for maintaining the nipple in its adjusted position. The lower end of the passage 20 communicates with a conduit 23 leading to the exhaust, while the valve piece 19 has a stem 24 preferably extending through the passage 20 and terminating in a second valve piece 25 which, in open position of the valve piece 19, seats within the lower end 26 of the passage 20 to cut off communication with the exhaust 23 in order that the steam may flow from the passage 20 to the pipe 27. When the valve piece 19 is closed the second valve 25 is open to permit the pipe 27 to be properly relieved of pressure, as will be understood. The pipe 27 communicates with a suitable diaphragm valve or like pressure regulator for controlling the admission of steam to the pump or like device for supplying water to the boiler. In view of the fact that any suitable type of control valve may be employed for this purpose, I have deemed it unnecessary to here illustrate a particular valve for the purpose, as the operation is well understood.

28 designates a plunger mounted for sliding movement in a sleeve 29, fixed to the auxiliary casing 10 in a position to properly locate the plunger 28 in alined relation with the arm 17 of the spindle 8 and having a bearing thereon to exert a pressure tending to counterbalance the weight of the float 5. The plunger 28 is pressed outwardly by the spring 31, the tension of which is controlled by a member 32 adjustably mounted in the casing 10 and held in its fixed position by a lock nut 33. From the foregoing it will be seen that the spring pressed plunger 28 operates upon the arm 30 in such a manner as to balance the weight of the float 5 so that when the latter rises under the action of the water filling the column, the drag of the float becomes compensated and the operation of the parts rendered more sensitive and accurate.

In case the water level should reach a dangerously low point or, on the other hand, be raised above the normal water level, I have provided an alarm device to automatically call attention to the existing abnormal conditions. This device, in the present instance, consists of a whistle 34 suitably mounted upon the casing 10 and controlled by a needle valve 35, the stem of which is connected to a pin 36 having connection with a pair of operating arms 37 and 38. These arms, while both connected to the pin 36 are pivoted for independent movement and have parts respectively in the path of movement of a lug 39 of the rock spindle, one part of one arm being at one side of the lug and the other part at the opposite side. Under normal swinging movement of the lug 39 neither arm is engaged, but if the limits of travel corresponding to the normal water level conditions are exceeded, the pin 39 will contact with one or the other of the arms, causing such arm to swing about its pivot and shift the spindle 35 to an open position so that steam is admitted to the whistle and an alarm sounded.

Should it be desired to repair or replace any of the parts of the regulator while the boiler is in operation, the admission of steam by way of the stem of the rock spindle 8 may be cut off by feeding the set screw 40 outwardly so that the bearing pressure upon the stem 8 is relieved, whereupon the pressure in the chamber 4 moves the spindle 8 to seat the valve 13, as will be understood. As a modification of this construction I have shown in Fig. 5 a construction wherein the rock spindle 8 is of cylindrical shape and has a close fitting bearing with the parts to prevent the passage of steam, the latter being admitted to the auxiliary casing by way of a port 41 through the abutting walls of the respective casings. This port under normal operating conditions is open to admit pressure to the casing 10, but may be cut off according to requirements by the manually operable valve 42 which extends to the outside of one of the casings where it is provided with an operating hand wheel 43.

In Fig. 4 I have shown the regulator employed as an auxiliary device so that it may be attached to the ordinary water column of a boiler without necessitating any change in the usual equipment. In this construction the float is located in the chamber 44 which has communication by way of the pipe 45 with the steam space of the column 46, while the lower end of the casing communicates below the water level of the column by way of the pipe 47.

In the operation of the device it will be understood that as long as the water level remains normal there will be practically no movement of the float, though should the level be raised or lowered there will, of course, be a corresponding movement of the float. As the float moves one way or the other, the lever arm 7 transmits the movement to the spindle 8 which in case of an excess amount of water being supplied causes the pin 16 to strike the lever 18 and thereby raise the valve 19 from its seat. This action admits steam to the passage 20 from which it is delivered by pipe 27 to the control valve for the pump so that the latter is closed and the feeding of water to the boiler ceases. In case the water level lowers, the reverse action takes place and the spindle 8 is rocked in a direction to move the pin 16 out of contact with the lever 18, whereupon the valve 19 closes and cuts off the supply of steam. At the same time the valve 25 opens so that the line pipe 27 is exhausting and the control valve consequently automatically opens to start the pumping of feed water. It will be understood, however, that the operation of the control valve may take place in various ways, and in the present instance I have merely shown a preferred form by way of example. It will be noted that the weight of the float 5 is accurately compensated by the bearing action of the spring pressed plunger 28 so that changes in the level of the water act promptly upon the float, since the weight of the latter is taken up by the oppositely acting spring mechanism.

In case the pumping mechanism should become inoperative for any cause, and the water level therefore drop to a dangerously low point or be raised to an excessively high point, then the movement of the spindle 8 in one direction or the other will cause the pin 39 to contact with one of the levers 37 or 38 and open the valve 35 so that steam is admitted to the alarm whistle 34 to notify the attendant of the conditions. It will be understood that the arms 37 and 38 close the valve by gravity action.

Since the valve mechanism, and other adjuncts incident thereto of the regulator, are located in an auxiliary chamber attached to the water column, it will be evident that by the provision of a removable cap such as shown at 15, any of the parts are rendered readily accessible while the boiler is in operation, provided means are employed for cutting off the steam supply to the auxiliary casing. In the preferred embodiment of the invention this is accomplished by partially withdrawing the abutting screw 40 from contact with the stem of the spindle 8 so that the latter is free to move under the pressure of the steam and close the valve 13. In case the modified form of the invention shown in Fig. 5 is employed, the same accessibility exists since the steam may be temporarily cut off by operating the needle valve 42. It will now be apparent that I have devised a complete, unitary regulator consisting of few parts and readily adapted to be attached to the ordinary boiler or tank, or to the water column of a boiler without change in the existing equipment. Thus, for example, in the apparatus shown in Fig. 4 it is entirely unnecessary in assembling the device to remove the water column which is already attached to the boiler, since the regulator may be readily coupled thereto by unions or like fastening means and be made ready for use within a comparatively short time.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having now described my invention, what I claim and desire to protect by Letters Patent is:

1. In a feed water regulator, the combination of a casing having communication with a boiler or tank above and below the water line, a float member in said casing, an auxiliary casing connected to said first casing, valve means in said auxiliary casing and connected to and under the control of said float for governing the supply of steam to a control mechanism for a feed water supply, said casings having means forming a communication between the two for the passage of steam, and means extending exterior of one of said casings for opening and closing said communicating means at will whereby one casing may be shut off from another for repair purposes.

2. In a feed water regulator, the combination of a main casing having communication with a boiler or tank above and below the water line, an auxiliary casing secured to said main casing and provided with means to establish communication with said main casing, a removable cover for said auxiliary casing, a spindle journaled in one of said casings and projecting into both casings, a float in said main casing directly connected to said spindle, valve means in said auxiliary casing for governing the supply of pressure fluid to a control mechanism for a feed water supply, said valve means being independent of said cover and operatively connected to said spindle and means operable from the exterior of one of said casings for closing communication between said casings at will, whereby access may be had to said valve means without reducing the pressure in the boiler or tank.

3. In a feed water regulator, the combination of a main casing having communication with a boiler or tank above and below the water line, an auxiliary casing provided with means to establish communication with said main casing, a removable cover for said auxiliary casing, a spindle journaled in one of said casings and projecting into both casings, a float in said main casing directly connected to said spindle, a fitting adjustably connected to said auxiliary casing and provided with a plurality of valve seats, valves for respectively engaging said seats, means common to said valves and connected to said spindle for actuating said valves and a manually operated means for controlling communication between said casings, whereby access may be had to said valve means without reducing the pressure in the boiler.

4. In a feed water regulator, the combination of a main casing, having communication with a boiler or tank above and below the water line, an auxiliary casing secured to said main casing and provided with means to establish communication with said main casing, a removable cover for said auxiliary casing, a spindle journaled in one of said casings and projecting into both casings, a float in said main casing directly connected to said spindle, a fitting provided with valve seats secured to said auxiliary casing, said fitting having a bore between said valve seats arranged at substantially right angles to said spindle, valves for respectively engaging said seats, means common to said valves and connected to said spindle for actuating said valves and a manually operated means for controlling communication between said casings at will, whereby said cover may be removed without reducing the pressure in the boiler or tank.

5. In a feed water regulator the combination of a main casing having communication with a boiler or tank above and below the water line, a float member in said main casing, an auxiliary casing carried by said main casing, a rock spindle controlled by said float, an arm extending laterally from said spindle and terminating within said auxiliary casing, a valve for governing the supply of steam to a control mechanism for a feed water supply, means controlled by the movement of said arm for controlling the operation of said valve and adjustable spring controlled means mounted within said auxiliary casing for normally maintaining said float in balanced condition, whereby a substantially continuous supply of feed water is delivered to said boiler or tank.

In testimony that I claim the foregoing invention I hereunto set my hand this 27th day of April, 1915.

JOHN J. BUCKLEY.

Witnesses:
ROBERT M. BARR,
C. H. WISSMANN.